Patented Oct. 29, 1935

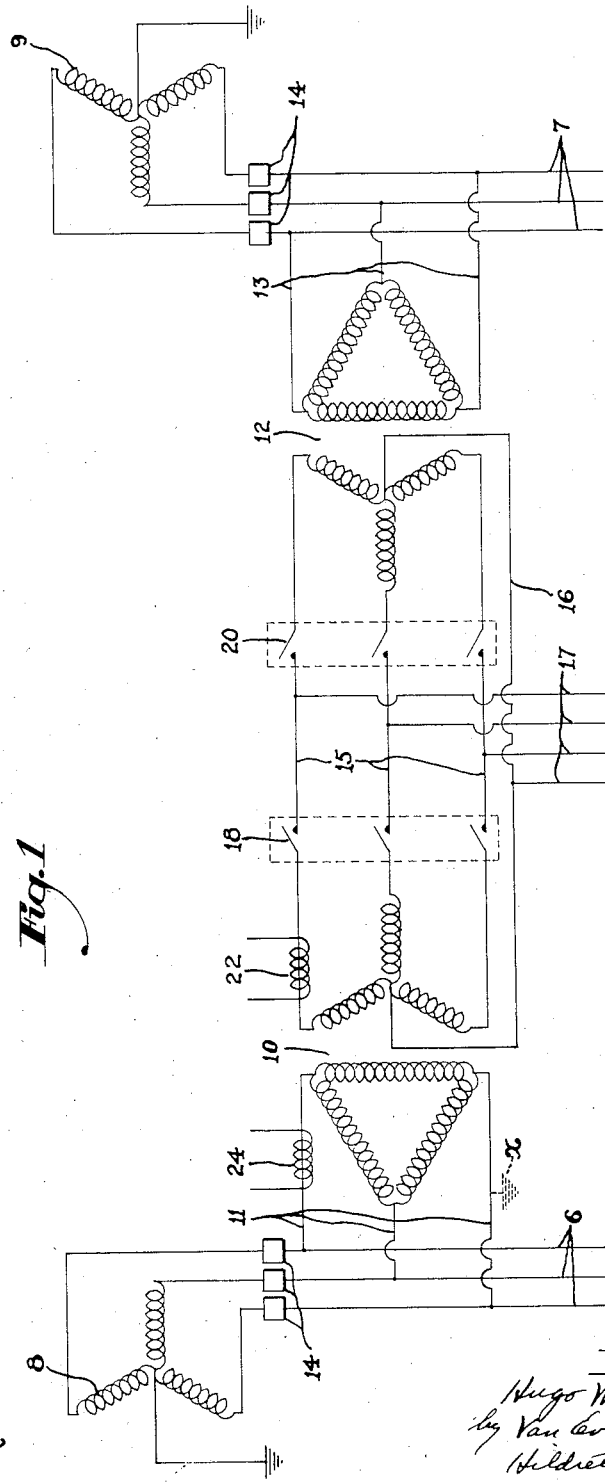

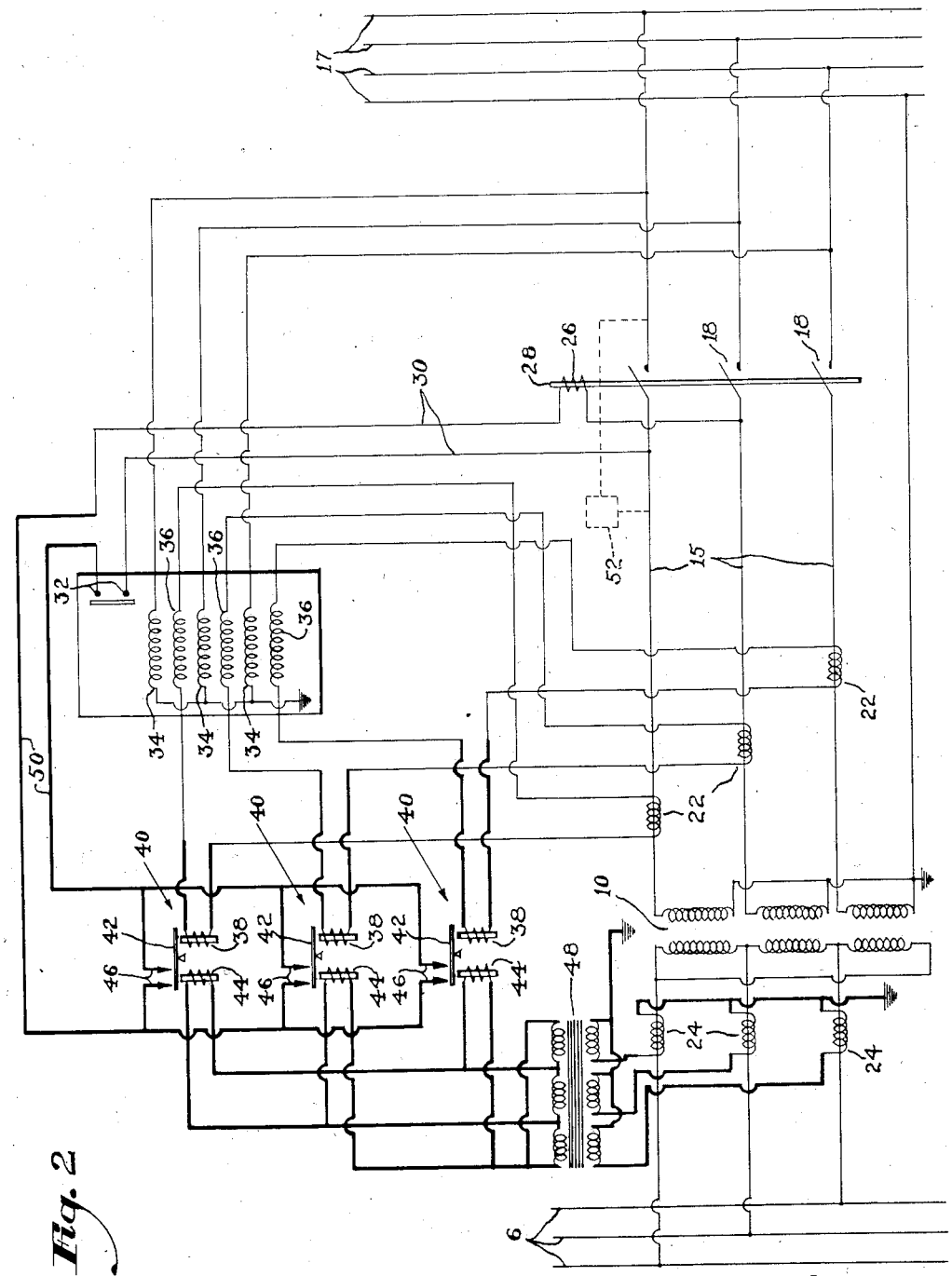

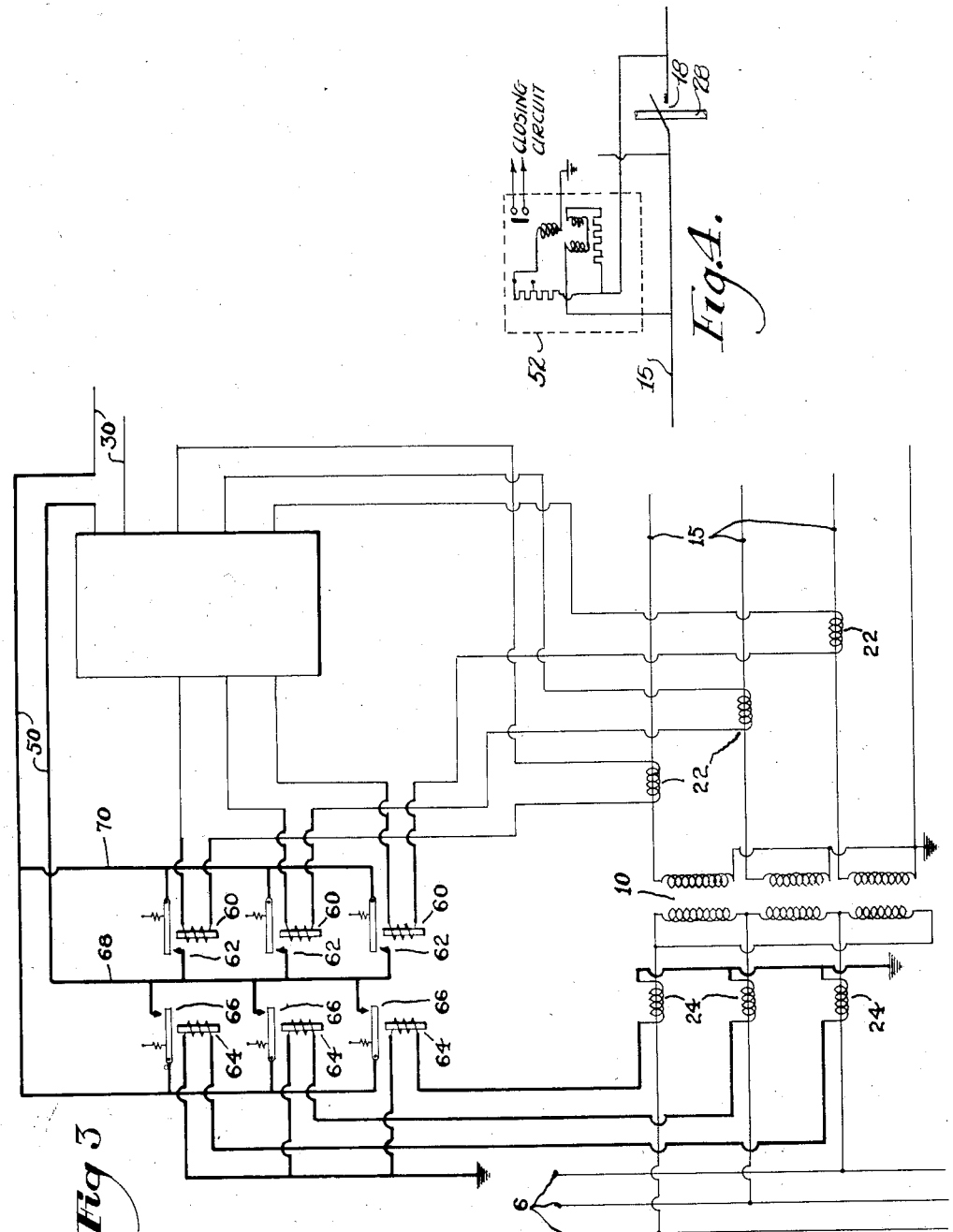

2,018,823

UNITED STATES PATENT OFFICE 2,018,823

PROTECTIVE SYSTEM

Hugo W. H. Wellington, Belmont, Mass.

Application June 7, 1932, Serial No. 615,922

21 Claims. (Cl. 175—294)

The present invention relates to protective systems for alternating current networks.

In low tension alternating current networks, particularly for city distribution, it is customary to energize the service buses from at least two separate transmission lines so that the service may continue uninterrupted in case of failure of one of the lines. With such a connection, it is possible that a transmission line may be disconnected from its source and yet remain energized through the network from the other line. To guard against the condition in which a faulty line may remain energized through the network, it is usual to provide protective devices involving the use of reverse current or reverse power relays which operate on a flow of power from the service buses toward the line.

For maximum protection, the reverse current relays should be set to operate at a low value not greater than the exciting current of the transformer. There are conditions, however, under which reverse flows of power are a normal condition of operation of the system. For example, the voltages of the two lines may be sufficiently out of phase to cause some transfer of energy from one line to the other or a feed of power from the service buses may be occasioned by the use of regenerative braking for elevator motors. Such regenerative effects, if confined within certain limits, are in no way harmful but result in unnecessary operation of the protective devices if the latter are set to operate on a low value of reverse current. Since these protective devices are not designed for continual operation, they are subjected to excessive mechanical and electrical wear. In order to avoid such unnecessary and detrimental operation of the protective devices, it has become the current practice to set the reverse current relays for currents of considerable magnitude, but this necessarily results in loss of the protection for which the relays are particularly designed.

The object of the present invention is to provide apparatus for inter-connected alternating current networks which is not only capable of affording maximum protection against overloads and abnormal reversals but which also prevents unnecessary operation of the equipment under such conditions of reverse flows as occur in the normal operation of the system.

With this object in view, the principal feature of the present invention comprises the provision of balanced or co-acting devices in both the high tension and low tension sides of the transformers and employed in connection with the protective devices to permit operation of the latter only upon the occurrence of overloads or reverse exciting currents, and to prevent operation thereof when the reverse current is in a normal working range such as would be encountered by an excess of power returned to the lines over that furnished to the connected load. In other words, the usual protective devices are rendered operative to act in this usual fashion only under either of the following two conditions:—(1) presence of a current of less than predetermined minimum value (or entire absence of current) in the high tension side of an energized transformer, which indicates that the transformer is being excited from the low tension side and (2) presence of a load greater than predetermined value, whether in normal or reverse direction. Under other conditions, which cover the working range of normal and reverse power flows, the protective devices are rendered inoperative.

In one form of the invention, there are associated with the usual reverse current and overload relays a set of balanced relays which prevent operation of the reverse current relays whenever currents of less than overload value appear in both the high and low tension sides of the transformers regardless of the direction thereof. However, when a current in the low tension side finds no counterpart in the high tension side, as when the exciting current is furnished to the low tension side, the balanced relays are thrown out of balance and the reverse current relay is permitted to operate. Means are also provided to unbalance the relays upon overload currents in either direction, thereby permitting operation of the protective devices.

In another form of the invention, similar results are obtained by the use of underload relays in the high tension side and overload relays in the low tension side, all of the relays being associated with the usual reverse current and protective devices. The underload relays in the high tension side are constructed to function whenever the high tension current drops below the normal value of the exciting current for the transformer, while the overload relays in the low tension side are set for currents in excess of the safety requirements of the system. Thus, upon the failure of the high tension lines to supply exciting current or upon the occurrence of an overload, the ordinary protective devices can operate, but when currents exist in the working range in either direction, the protective devices are rendered inactive.

In the accompanying drawings, Fig. 1 is a schematic diagram illustrating the conditions of dual feed to a single set of buses; Fig. 2 is a diagram showing the lines similar to Fig. 1 and employing one form of protective apparatus according to the present invention; Fig. 3 is a diagram showing in modified form the present invention; and Fig. 4 is a diagram on an enlarged scale of the phasing relay.

In Fig. 1 is shown a portion of an alternating current network comprising two separate high tension 3-phase transmission lines 6 and 7, preferably originating in two separate generating or sub-stations and energized by suitable sources represented as the station transformers 8 and 9, shown connected in grounded Y. The lines 6 are connected to a three-phase transformer 10 by lines 11, and the lines 7 are connected to a three-phase transformer 12 by lines 13. The transformers 10 and 12 have their primaries connected in delta and the low tension secondaries are connected in grounded Y. The high tension lines 6 and 7 include any usual or preferred form of overload protectors 14. Corresponding phases of the two low tension circuits are connected together by the wires 15, and the neutrals are connected by a wire 16, all of these connections leading to the low tension buses 17. This arrangement is commonly employed in the so-called vault system, in which the separate lines 11 and 13 run to the transformers 10 and 12 in underground vaults, the transformers being then connected through the low tension buses and suitable cables to the service area.

It will be noted that under normal conditions, power flows from both the lines 6 and 7 through the transformers to the buses 17. In the event of failure of one of the lines, the service continues uninterruptedly from the other line.

Included in each of the phase connections 15 on opposite sides of the bus connections are protector switches 18 and 20, the two complete three-phase switches being indicated as enclosed within the dotted lines of Fig. 1. These protector switches form a part of the usual reverse current and overload relays, which will be more fully explained later. It is sufficient to point out that each reverse current and overload relay comprises a potential coil and a current coil for each phase, each current coil being energized by a current transformer, one of which is shown at 22 in Fig. 1. The parts thus far described are well-known and form by themselves no part of the invention.

The protector switches 18 may be set to open at a value less than the exciting current of the transformer 10 so that the contacts 18 will be open to de-energize the transformer 10 whenever the line 6 or 11 is dead. Upon restoration of normal average conditions, the contacts 18 may be again closed by a phasing relay of well-known form. In practice, however, it is not customary to set the protective devices to operate upon exciting current alone, because reversal of current due to normal operations such as regenerative braking would result in continual opening and closing of the contacts. Such action would be undesirable because operation of the contacts should be reserved for actual faults in the system. It is customary, therefore, to set the relays for operation at a current value greater than that normally encountered in regenerative actions. This, however, will not serve to de-energize the transformers if the high tension line is put out of service for any reason other than a phase-to-phase fault. If the line 6, for example, is merely opened, the transformer 10 will be energized from exciting current on the low tension side, this exciting current coming through the network from the line 7. Furthermore, should a phase-to-ground fault appear in the high tension side of the line, as indicated at X in Fig. 1, although the circuit breakers 14 will open, the transformer will continue to be energized by exciting current from the low tension side, although sufficient current will not flow to operate the overload protective devices. This is a particularly dangerous condition because of the high voltages above ground existing in the transformer and the connected high tension line. A further hazard exists in the fact that the line 6 remains energized beyond the circuit breakers 14; therefore any indicating apparatus on the line gives a normal indication which does not apprise the operator of the actual faulty conditions. Normal execution of a switching operation based on the false indication may then result in damage to apparatus.

According to the present invention, the operation of the protective switches 18 and 20 is controlled by balanced relays operated from currents in both the high and low tension sides. The apparatus employs the current transformer 22, already described, and a current transformer indicated at 24 in the high tension side. The transformers 22 and 24 are shown in Fig. 1 as being included in only one phase, but as will be explained in detail later, a similar set is provided for each phase.

A schematic diagram of connections is shown in Fig. 2. This diagram shows the connections from the three-phase transmission line 6 through the delta-Y transformers 10, the protector switch contacts 18, to the low tension buses 17. Similar connections leading from the other transmission line 7 through its transformer are made in exactly similar fashion to the buses 16 but are not shown in Fig. 2. The operating mechanism for the protector switch 18 comprises a trip coil 26 to operate a solenoid 28 connected with the contacts 18 of the three phases. The trip coil is connected across any two phases by wires 30 which lead to switch contacts 32. These switch contacts 32 are controlled by a current coil and a potential coil for each phase. The three potential coils are illustrated at 34, each being connected at one side to ground and at the other side to one of the low tension phase connecting wires 15. Each current coil 36 is energized from the current transformer 22 associated with the corresponding phase connection 15. As is customary with reverse current relays of this nature, reversal of power brings about a closing of the contacts 32 with consequent energization of the trip coil 26 and opening of the relay contacts 18. Moreover, the contacts 32 are caused to close upon any overload, whether the current is flowing in the normal or the reverse direction. This operation of the relays is well-known and the details of construction are not described herein.

According to the present invention, each current transformer 22, instead of being directly connected to a current coil 36 of the reverse current relay, is connected thereto through a coil indicated at 38, which forms a part of a master or balanced relay 40. That is to say, one of the relay coils is interposed between each current transformer and the corresponding current coil of the reverse current relay. One form of a suitable balanced relay is shown in Fig. 2, wherein the fulcrumed arm 42 is oppositely acted upon by both the coil 38 and a restraining coil 44. The coils 38 and 44 are so arranged that two contacts 46 are normally maintained open, but upon a preponderance of current in coil 38, the contacts 46 are closed. Any type of relay that operates in this manner may be employed. It will be noted in Fig. 2 that the restraining coil 44 of each master relay is connected through a delta-Y transformer 48 with a current transformer 24 in the high tension line. The delta-Y transformer 48 is employed to restore the proper phase relation to the currents in the coils 38 and 44, the original phase relation having been displaced by the main transformer 10. The contacts 46 of the three master relays are all connected in parallel by wires 50 and these wires 50 connect into one of the wires 30 that leads from the reverse current relay switch 32 to the trip coil 26. It will be seen, therefore, that in order to energize the trip coil 26, it is necessary to close not only the relay contacts 32, but also the contacts 46 of one of the master relays. The connections from the current transformers 22 and the master relay coils 38 and 44 are indicated in heavy lines in Fig. 2 to show the mode of connecting these devices into the ordinary protective circuits, which are shown in light lines.

The delta-Y transformer 48 is a saturating transformer, that is, it is constructed with only sufficient iron so that it operates well up on the saturation curve, the magnetization being about at the knee of the curve for some predetermined load, and rising to the flat part of the curve for higher loads. Thus, the currents in the coils 44 which connect with the high tension side of the main transformer cannot rise appreciably above a certain predetermined value, regardless of the magnitude of the currents in the line. It will be understood that the various current transformers are of such ratios that normal currents produce about equal effects in the relay coils 38 and 44.

In addition to the apparatus shown in Fig. 2, a so-called phasing relay of any usual or preferred form is employed. This is shown diagrammatically at 52 in Fig. 2 and in enlarged detail in Fig. 4, and is connected across the protective contacts 18. This relay functions in its normal manner, after opening of the contacts 18, to restore the contacts to closed position when the voltages on opposite sides thereof are of approximately the same magnitude and phase angle.

Under normal operation, the flow of power is from the transformer through the phase connections 15 to the bus. The reverse current relay contacts 32 are open, the protector contacts 18 are closed, and the master relay contacts 46 may be open or closed, depending on the magnitudes of the currents in the network. No operation of any relay occurs.

Under regenerative effects, such as those occurring by regenerative braking or by transfer of energy from one line to the other through phase differences, the reverse power relay contacts 32 are closed if the reverse power is greater than the power being supplied to other loads in the service area. Under such conditions, however, the currents in the master relay coils 38 and 44 remain substantially equal so there is no tendency to move the contact arm 42 from its normal open position. The closure of the reverse current relay contacts 32 is in such cases ineffective to cause operation of the protector trip coil. Such regenerative effects are normal, and no protective action is necessary or desirable.

A short-circuit on the low tension bus causes closure of the contacts 32 since the reverse current relay is also designed for overload protection. Also the currents in the opposed coils 38 and 44 are unbalanced, the restraining effect of the coil 44 being now diminished because of the saturation effect of the transformer 48. The master relay contacts 46 therefore close and permit current to flow in the protector trip coil 26 to cause opening of the protector contacts 18.

A phase-to-phase short-circuit on the high tension side of the transformer produces a similar effect. Such a short-circuit will ordinarily isolate the line 6 from the generating station by opening of the main circuit breakers, but there remains the possibility of the current flow from the live line through the low tension network into the short-circuit. Under these conditions, the reverse current relay operates both because of the reversal of power and because of the excess of current. Due to the saturation in the transformer 48, the coils 38 and 44 are unbalanced. Therefore, the contacts 46, as well as the reverse current relay contacts 32, are closed, thereby opening the protector contacts 18.

In the event of opening of the main line 6 or in the event of a phase-to-ground fault which would not be reflected in a heavy reverse current, there is a small reverse current on the low tension side. This reverse current is the exciting current for the transformer 10. Since the high tension line, however, is open, there is no current in the high tension side. Therefore, the restraining coils 44 are inoperative and the master relay contacts 46 are closed under the action of the coils 38. This also permits operation of the protector trip coil and opening of the protector contacts 18.

It will be seen, therefore, that the reverse current relay is permitted to operate upon the occurrence of (1) an overload with either normal or reverse current or (2) a reverse current in the low tension side without a corresponding reverse current in the high tension side. The reverse current relay, however, is not permitted to operate upon direct feed of currents of less than overload value, nor is it permitted to operate upon reverse power flows whenever the current in the low tension side finds a counterpart in the high tension side. This latter condition takes care of normal regenerative action, such as elevator braking.

In some instances, it may be desirable to trip the circuits for a lower value of reverse overload than for direct overload. This may be accomplished by proper design of the saturating transformer and proper setting of the reverse current and overload relay. For example, the reverse current and overload relay may be set to trip at 150% of full load, and the saturating transformer 60 may be designed to saturate at currents above 50% of full load. Therefore, for loads above 50%, the restraining coils 44 of the balanced relays 40 become inactive, thereby closing the contacts 46 and placing the system under the control of the reverse current and overload relay. Therefore, so long as the feed of power is in normal direction, the circuit will not trip until 150% load is reached, but under reversal of power, tripping may occur at 50% load. It will be understood that the term "overload" as used herein does not necessarily specify the same percentage load for both directions; for the settings assumed above, reverse power of more than 50% of full load is an overload, whereas for normal direction, an overload sufficient to trip the circuits is about 150% of full load.

It is possible that conditions may sometimes arise in which the regenerative action may just sufficiently overbalance the other loads to impress only exciting current on the low tension side of the transformers, so that the master relay coils 38 and 44 are permitted to have a differential action and thereby to operate the protector trip coil in the same manner as operation under exciting current when the high tension side of the transformer is dead. However, such an action can occur only infrequently and can only be of momentary duration, since the protector contacts are reclosed almost immediately upon operation of the phasing relay.

It will be understood that the term "reverse current" is used in its ordinary engineering sense. Actually, reverse current in alternating currents is meaningless, but the term is employed to distinguish between normal and reverse flows of power. The balanced relays work only on the magnitudes of the currents in the high and low tension sides, and reversal is distinguished only by the provision of potential coils in the reverse current relay.

The construction shown in Fig. 3 is a somewhat simpler arrangement for accomplishing the same results. In this construction, two sets of individual relays in the high tension and low tension sides are substituted for the master relays and the saturation transformer of the Fig. 2 diagram. The low tension current transformers 22 are retained, as are the high tension current transformers 24. Each low tension current transformer 22 is connected in series with a relay coil 60 which in turn is connected in series with the current coil 36 of the reverse current relay. In other words, the coils 60 are connected in exactly similar fashion to the coils 38 of the construction of Fig. 2. Associated with each relay coil 60 is a pair of relay contacts 62. On the high tension side, each current transformer 24 is connected in series with a relay coil 64, each of which is associated with a pair of contacts 66. The contacts 62 and 66 of each of the six relays are connected in parallel by wires 68 and 70 and these are connected into the trip coil circuit by the wires 59 in exactly the same manner as the connections 59 introduced into the protector trip coil circuit of the construction of Fig. 2. The high tension relays 64 are underload relays, that is, their contacts are closed when de-energized and are adapted to open when the current in the coils 64 rises above a certain minimum value. The low tension relays 60 are overload relays, that is, their contacts are open when the relays are de-energized and are adapted to close when the current rises above a certain maximum value which is several times the minimum setting of the contacts 66. The setting of the high tension relays corresponds to the exciting current of the transformer. It will be seen that the system operates in substantially the same manner as that previously described. When the high tension side is open, following, say, a phase-to-ground fault, the relay contacts 66 close, thereby permitting operation of the reverse current relay. Upon the occurrence of reverse current greater than the exciting current, the high tension relays open, thereby preventing operation of the reverse current relay. Upon excessive currents, however, the contacts 62 which are associated with the low tension lines, are permitted to close, whether the power is in the normal or the reverse direction, thereby causing the reverse current relay to perform its usual function as an overload protector. As in the first modification, the overload trip action may be made to operate differently for normal and reverse flows. This is accomplished by setting the low tension relays to close upon occurrence of the predetermined reverse overload, which in the example chosen, is about 50% of normal full load. For currents greater than about 50% of normal full load current, the relay contacts 62 are closed, thereby rendering the reverse current relay operative, although with normal direction of power flow, tripping will not take place until 150% load is reached.

It will be seen, therefore, that either form of the invention permits operation of the protective devices under abnormal conditions, but prevents operation thereof under normal conditions. Abnormal conditions are said to exist when there is an overload in either direction or when the high tension line is disconnected from its source and is excited from the low tension side. Conditions are considered as normal if power less than overload value flows from the lines toward the buses, or if regenerative power between certain minimum and maximum limits flows in the reverse direction.

It will be understood that although the invention has been illustrated and described as embodied in its preferred forms, it is not limited to the particular embodiments described, but may be employed in other forms without departing from the scope thereof.

Having thus described the invention, what is claimed is:

1. In an alternating current supply system, the combination with separate high tension lines, transformers, and connected low tension circuits, of a reverse current and overload relay for each low tension circuit, means operated by currents of greater than a predetermined value in the high tension lines and load currents within a limited range for rendering the reverse current and overload relays ineffective, and means operated by currents of less than said predetermined value in the high tension lines for rendering the reverse current and overload relays effective.

2. In an alternating current supply system, the combination with separate high tension lines, transformers, and connected low tension circuits, of a reverse current and overload relay for each low tension circuit, and means operated by currents greater than a predetermined minimum in the high tension lines to render the reverse current and overload relays ineffective and having provision for rendering said relays effective upon high tension currents less than said predetermined minimum.

3. In an alternating current supply system, the combination with separate high tension lines, transformers, and connected low tension circuits, of a reverse current and overload relay for each low tension circuit, and means for rendering the reverse current and overload relays ineffective upon currents in the high tension side greater than a predetermined minimum, and means for rendering said relays effective upon currents in the high tension side less than a predetermined minimum or currents in the low tension side greater than a predetermined maximum.

4. In an alternating current supply system, the combination with separate high tension lines, transformers and connected low tension circuits, of a reverse current and overload relay for each low tension circuit, means responsive to high tension currents greater than a predetermined minimum, means responsive to load currents less than a predetermined maximum, and connections between said means and the reverse current and overload relay to render the latter ineffective under load conditions within a limited range.

5. In an alternating current supply system, the combination with separate high tension lines, transformers and connected low tension circuits, of a reverse current and overload relay for each low tension circuit, and means controlled by the high tension current acting to render the reverse current and overload relay ineffective when said current is greater than a predetermined minimum value and to render the reverse current and overload relay effective when said current is less than said predetermined minimum.

6. In an alternating current supply system, the combination with separate high tension lines, transformers and connected low tension circuits, of a reverse current and overload relay for each low tension circuit, and co-acting means controlled by the high-tension and low-tension currents to render the reverse current and overload relay ineffective when the system is carrying a load between predetermined minimum and maximum values in either direction.

7. In an alternating current supply system, the combination with separate high tension lines, transformers and connected low tension circuits, of a reverse current and overload relay for each low tension circuit, and co-acting means controlled by the high-tension and low-tension currents to render the reverse current and overload relay ineffective when the system carries a reverse load between predetermined minimum and maximum values.

8. In an alternating current supply system, the combination with separate high tension lines, transformers and connected low tension circuits, of a reverse current and overload relay for each low tension circuit, means responsive to high tention currents greater than the exciting current, means responsive to load currents less than a predetermined maximum, and connections between said means and the reverse current and overload relay to render the latter ineffective.

9. In an alternating current supply system, the combination with separate high tension lines, transformers and connected low tension circuits, of a reverse current and overload relay for each low tension circuit, means responsive to high tension currents greater than the exciting current, means responsive to load currents less than a predetermined maximum for normal direction of flow and less than another predetermined maximum for reverse direction of flow, and connections between said means and the reverse current and overload relay to render the latter ineffective.

10. In an alternating current supply system, the combination with separate high tension lines, transformers and connected low tension circuits, of a reverse current and overload relay for each low tension circuit, means responsive to high tension currents less than a predetermined minimum to render the reverse current and overload relay effective, means responsive to load currents greater than a predetermined maximum to render the reverse current and overload relay effective, said means co-acting to render the reverse current and overload relay ineffective for high tension currents greater than the exciting current and less than a predetermined overload current.

11. In an alternating current supply system, the combination with separate high tension lines, transformers and connected low tension circuits, of a reverse current and overload relay for each low tension circuit, a balanced relay connected with the reverse current and overload relay, said balanced relay having means responsive to high tension currents less than the exciting current and having means responsive to overload currents to render the reverse current and overload relay effective.

12. In an alternating current supply system, the combination with separate high tension lines, transformers and connected low tension circuits, of a reverse current and overload relay for each low tension circuit, a balanced relay connected with the reverse current and overload relay to render the latter normally ineffective, the balanced relay having an overload element and a restraining element, and means for energizing the restraining element from the high tension line to prevent operation of the balanced relay when the current in the low tension side is less than a predetermined maximum and has a counterpart in the high tension side.

13. In an alternating current supply system, the combination with separate high tension lines, transformers and connected low tension circuits, of a reverse current and overload relay for each low tension circuit, a balanced relay having contacts connected with the overload and reverse current relay, an overload element for the balanced relay energized in accordance with the load current, a restraining element for the balanced relay, and means for energizing the restraining element in accordance with the high tension current having provision for limiting energization thereof for currents above a predetermined value.

14. In an alternating current supply system, the combination with separate high tension lines, transformers and connected low tension circuits, of a reverse current and overload relay for each low tension circuit, a balanced relay having contacts connected with the overload and the reverse current relay, an overload element for the balanced relay, a restraining element for the balanced relay energized in accordance with the high tension current, and saturating means for limiting the energization of the restraining element.

15. In an alternating current supply system, the combination with separate high tension lines, transformers and connected low tension circuits, of a reverse current and overload relay for each low tension circuit, a balanced relay having normally open contacts connected with the reverse current and overload relay, an overload coil for the balanced relay, means for energizing the overload coil in accordance with the load current, a restraining coil for the balanced relay, means for energizing the restraining coil in accordance with the high tension current, and a saturation transformer to limit the energization of the restraining coil.

16. In an alternating current supply system, the combination with separate high tension lines, transformers and connected low tension circuits, of a reverse current and overload relay for each low tension circuit, a balanced relay having normally open contacts connected with the reverse current and overload relay, an overload coil for the balanced relay, means for energizing the overload coil in accordance with the load current, a restraining coil for the balanced relay, means for energizing the restraining coil in accordance with the high tension current, and a saturation transformer to limit the energization of the restraining coil, the saturation transformer being constructed to saturate at a current considerably greater than the exciting current but lower than normal flow overload current.

17. In an alternating current supply system, the combination with separate high tension lines, transformers and connected low tension circuits, of a reverse current and overload relay for each low tension circuit, a relay controlled by the low tension current and having contacts adapted to close at currents greater than a predetermined maximum, a relay controlled by the high tension current and having contacts normally open and adapted to close for currents less than a predetermined minimum, and connections between said contacts and the reverse current and overload relay to render the latter effective upon closure of any of said contacts.

18. In an alternating current supply system, the combination with separate high tension lines, transformers and connected low tension circuits, of a reverse current and overload relay for each low tension circuit, an overload relay having normally open contacts and associated with the low tension line, an underload relay having normally open contacts and associated with the high tension line, and connections between said contacts and the reverse current and overload relay to render the latter effective when any of said contacts are closed.

19. In an alternating current supply system, the combination with separate high tension lines, transformers and connected low tension circuits, of a reverse current and overload relay for each low tension circuit, an overload relay having a coil energized in accordance with the low tension current and normally open contacts adapted to close upon currents greater than a predetermined maximum, an underload relay having a coil energized in accordance with the high tension current and having normally open contacts adapted to close upon high tension currents less than the exciting current, and connections between said contacts and the reverse current and overload relay to render the latter effective only upon closure of the contacts of one or more of said relays.

20. In an alternating current supply system, the combination with separate high tension lines, transformers and connected low tension circuits, of a reverse current and overload relay for each low tension circuit, an overload relay having a coil energized in accordance with the low tension current and having normally open contacts adapted to close upon currents greater than a predetermined maximum, an underload relay energized in accordance with the high tension current and having contacts normally maintained open and adapted to close when the high tension current falls to a value lower than the normal exciting current, and connections between said contacts operating upon closure of any thereof to render the reverse current and overload relay effective.

21. In an alternating current supply system, the combination with separate high tension lines, transformers and connected low tension circuits, of a reverse current and overload relay for each low tension circuit, an overload relay having a coil energized in accordance with the low tension current and having normally open contacts adapted to close upon currents greater than a predetermined maximum, said maximum being lower than the overload value at which the reverse current overload relay operates, an underload relay energized in accordance with the high tension current and having contacts normally maintained open and adapted to close when the high tension current falls to a value lower than the normal exciting current, and connections between said contacts operating upon closure of any thereof to render the reverse current and overload relay effective.

HUGO W. H. WELLINGTON.